(12) United States Patent
Stagi et al.

(10) Patent No.: US 7,723,611 B2
(45) Date of Patent: May 25, 2010

(54) CABLE CONNECTOR HAVING FLUID RESERVOIR

(75) Inventors: William R. Stagi, Burien, WA (US); James Steele, Seattle, WA (US)

(73) Assignee: UTILX Corporation, Kent, WA (US)

( * ) Notice: Subject to any disclaimer, the term of this patent is extended or adjusted under 35 U.S.C. 154(b) by 0 days.

(21) Appl. No.: 12/481,431

(22) Filed: Jun. 9, 2009

(65) Prior Publication Data

US 2009/0246995 A1 Oct. 1, 2009

Related U.S. Application Data

(63) Continuation of application No. 11/110,024, filed on Apr. 19, 2005, now abandoned.

(51) Int. Cl.
*H01B 9/06* (2006.01)
(52) U.S. Cl. .................. 174/15.1; 174/84 R; 174/88 R; 174/15.4
(58) Field of Classification Search ................ 174/15.4, 174/15.1, 74 R, 77 R, 84 R, 88 R
See application file for complete search history.

(56) References Cited

U.S. PATENT DOCUMENTS

| | | | |
|---|---|---|---|
| 1,846,361 A | 2/1932 | Saylor | |
| 2,248,588 A | 7/1941 | Shanklin | |
| 2,938,940 A | 5/1960 | Calendine | |
| 2,958,844 A | 11/1960 | Smith | |
| 3,036,147 A | 5/1962 | Wheaton | |
| 3,242,255 A | 3/1966 | Falkenstein | |
| 3,649,952 A | 3/1972 | Harmon | |
| 3,791,406 A | 2/1974 | Philipps | |
| 3,810,078 A | 5/1974 | Chordas | |
| 3,846,578 A | 11/1974 | Bahder | |
| 3,883,208 A | 5/1975 | Sankey | |
| 4,077,494 A | 3/1978 | Spaude | |
| 4,144,404 A | 3/1979 | De Groef | |
| 4,202,591 A | 5/1980 | Borgstrom | |
| 4,222,801 A * | 9/1980 | Gold | ............ 156/49 |
| 4,370,517 A | 1/1983 | Soma | |
| 4,372,988 A | 2/1983 | Bahder | |
| 4,477,376 A | 10/1984 | Gold | |

(Continued)

FOREIGN PATENT DOCUMENTS

DE 1059527 6/1959

(Continued)

OTHER PUBLICATIONS

English Translation of Taiwanese Search Report dated Aug. 27, 2009, issued in Taiwanese Patent Application No. 95113766, filed Apr. 18, 2006.

(Continued)

*Primary Examiner*—William H Mayo, III
(74) *Attorney, Agent, or Firm*—Christensen O'Connor Johnson Kindness PLLC

(57) ABSTRACT

Embodiments of a cable connector are provided that include an inner connector assembly and an outer connector housing. In use, the cable connector securely fastens or splices together at least two cables or cable sections and in electrical communication while also providing fluid communication therebetween. The cable connector further protects, and preferably seals off, the connection interface between the cables or cable sections and from the environment.

30 Claims, 8 Drawing Sheets

U.S. PATENT DOCUMENTS

| | | | |
|---|---|---|---|
| 4,484,022 | A | 11/1984 | Eilentropp |
| 4,545,133 | A | 10/1985 | Fryszczyn |
| 4,669,792 | A | 6/1987 | Kjeldstad |
| 4,875,952 | A * | 10/1989 | Mullin et al. ............... 156/48 |
| 4,888,886 | A | 12/1989 | Eager, Jr. |
| 4,946,393 | A | 8/1990 | Borgstrom |
| 5,082,449 | A | 1/1992 | Borgstrom |
| 5,132,495 | A | 7/1992 | Ewing |
| 5,215,475 | A | 6/1993 | Stevens |
| 5,245,133 | A | 9/1993 | DeCarlo |
| 5,907,128 | A | 5/1999 | Lanan |
| 6,332,785 | B1 | 12/2001 | Muench, Jr. |
| 6,338,637 | B1 | 1/2002 | Muench, Jr. |
| 2002/0046865 | A1 * | 4/2002 | Bertini et al. ............ 174/84 R |

FOREIGN PATENT DOCUMENTS

| | | | |
|---|---|---|---|
| DE | 3149048 | A1 | 6/1983 |
| DE | 69508087 | T2 | 10/1999 |
| DE | 69821366 | T2 | 7/2004 |
| EP | 0621607 | A1 | 10/1994 |
| GB | 870165 | | 6/1961 |
| WO | 98/36482 | A1 | 8/1998 |
| WO | 01/28059 | A1 | 4/2001 |

OTHER PUBLICATIONS

Eager, Jr., G.S., et al., "Extending Service Life of Installed 15-35 KV Extruded Dielectric Cables," IEEE Transaction on Power Apparatus and Systems PAS-103(8):1997-2005, Aug. 1984.

German Examination Report dated Jan. 27, 2009, issued in corresponding German Application No. 11 2006 000 974.5, filed Apr. 17, 2006 (with English translation).

Canadian Office Action mailed Nov. 23, 2009, issued in corresponding Canadian Application No. 2,604,945, filed Apr. 17, 2006.

* cited by examiner

CABLE CONNECTOR HAVING FLUID RESERVOIR

CROSS-REFERENCE TO RELATED APPLICATION

This application is a continuation of U.S. application Ser. No. 11/110,024, filed Apr. 19, 2005, the disclosure of which is hereby expressly incorporated by reference.

FIELD OF THE INVENTION

Embodiments of the present invention relate generally to cable connectors suitable for use with electrical power cables, and more particularly, to cable connectors, such as splice connectors, that interconnect at least two electrical power cables or cable sections.

BACKGROUND OF THE INVENTION

Typical underground electrical cables include a number of copper or aluminum strands surrounded by a semiconducting or insulating strand shield, a layer of insulation, and an insulation shield. This design of underground cables is known for having a useful life of 25-40 years. In some instances, the life span of an underground cable is shortened when water enters the cable and forms micro-voids in the insulation layer. These micro-voids spread throughout the insulation layer in a tree like shape, collections of which are sometimes referred to as water trees.

Water trees are known to form in the insulation layer of electrical cables when medium to high voltage alternating current is applied to a polymeric dielectric (insulator) in the presence of water and ions. As water trees grow, they compromise the dielectric properties of the polymer until the insulation layer fails. Many large water trees initiate at the site of an imperfection or a contaminant, but contamination is not a necessary condition for water trees to propagate.

Water tree growth can be eliminated or retarded by removing or minimizing the water or ions, or by reducing the voltage stress. Another approach requires the injection of dielectric enhancement fluid into interstices located between the strands of the cables. Please see U.S. Pat. No. 5,907,128 for a more detailed description of such an approach. The fluid reacts with water inside the cable and oligomerizes to slow diffusion and provide long lasting dielectric enhancing fluid. The oligomerized fluid functions as a water tree retardant and provides other beneficial properties.

SUMMARY OF THE INVENTION

In accordance with embodiments of the present invention, an apparatus for interconnecting a first cable and a second cable is provided. The first and second cables each comprise an exposed electrically conductive core and an outer insulating layer. The apparatus includes a coupling that electrically interconnects the first and second cables, wherein the coupling defines a first fluid pathway that connects the core of the first cable in fluid communication with the core of the second cable; and at least one internal fluid reservoir disposed in fluid communication with the core of the first or second cable.

In accordance with another embodiment of the present invention, an apparatus for interconnecting a first cable and a second cable is provided. The first and second cables each comprise an exposed electrically conductive core and an outer insulating layer. The apparatus includes a coupling that electrically interconnects the first and second cables. The coupling defines a first fluid pathway that connects the core of the first cable in fluid communication with the core of the second cable. The apparatus further includes at least one internal fluid reservoir disposed in fluid communication with either core of the first or second cable, and an actuator chamber fluidly isolated from the at least one internal fluid reservoir.

In accordance with another embodiment of the present invention, an apparatus for interconnecting a first cable and a second cable is provided. The first and second cables each comprise an exposed electrically conductive core and an outer insulating layer. The apparatus includes a housing that defines a sealable interior cavity and a coupling disposed in the interior cavity. The coupling electrically and mechanically interconnects the first and second cables. The coupling defines a first fluid pathway that connects the core of the first cable in fluid communication with the core of the second cable. The apparatus further includes a fluid reservoir disposed in the interior cavity, and means for forcing the contents of the fluid reservoir into the core of the first or second cable.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENTS

Aspects of the present invention will now be described with reference to the drawings where like numerals correspond to like elements. Embodiments of the present invention are directed to cable connectors, such as cable splice connectors, suitable for interconnecting or splicing together at least two cables or cable sections. More specifically, embodiments of present invention are generally directed to cable connectors that interconnect or splice together at least two cables or cable sections while providing at least one fluid pathway for remediation fluid to flow therebetween. Additionally, some embodiments of the present invention include one or more internal cavities, referred herein as fluid reservoirs, that are capable of storing a selected volume of remediation fluid for subsequent introduction or reintroduction to the cables or cable sections. Although exemplary embodiments of the present invention will be described hereinafter as suitable for interconnecting or splicing electrical power cables or cable sections, it will be appreciated that aspects of the present invention have wide application, and may be suitable for interconnecting other cables or cable sections having an insulation overlayer, such as optical or data transmission cable. Accordingly, the following descriptions and illustrations herein should be considered illustrative in nature, and thus, not limiting the scope of the present invention, as claimed.

Figure 1:
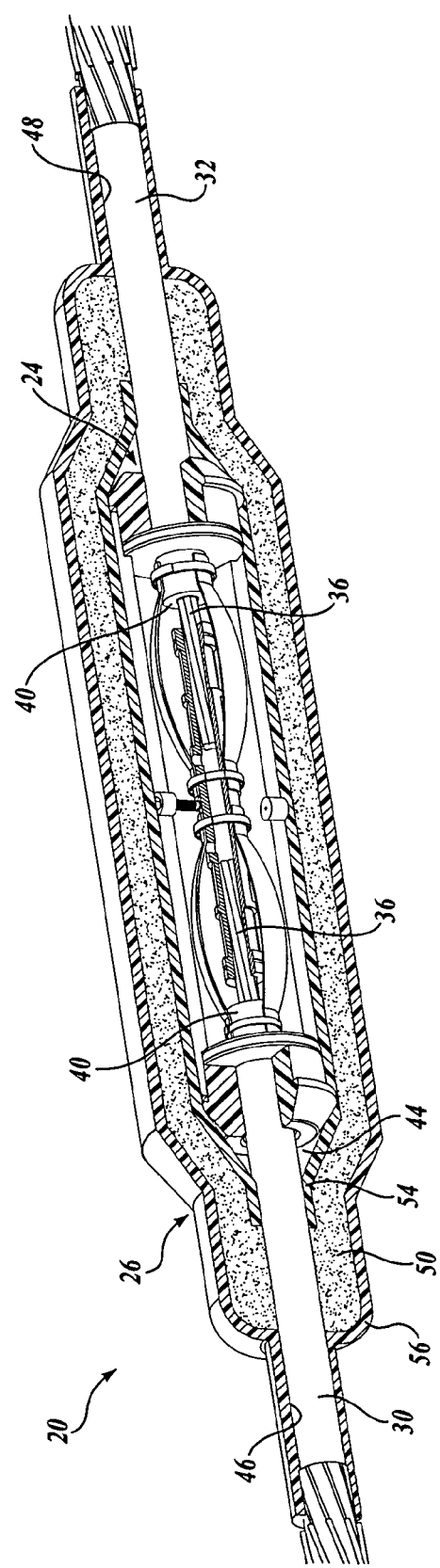
FIG. 1 is a perspective, partial cross sectional view of one exemplary embodiment of a cable connector constructed in accordance with aspects of the present invention.

FIG. 1 illustrates a perspective, partial cross sectional view of one exemplary embodiment of a cable connector 20 constructed in accordance with aspects of the present invention. Generally described, the cable connector 20 includes an inner connector assembly 24 and an outer connector housing 26. In use, the cable connector 20 securely fastens or splices together at least two cables or cable sections 30 and 32 in electrical communication while also providing fluid communication therebetween. The cable connector 20 further protects, and preferably seals off, the connection interface between the cables or cable sections 30 and 32 from the environment.

In one embodiment, the cables or cable sections 30 and 32 each include a conductive core 36 and an insulation layer 40. The cables or cable sections 30 and 32 may include other components well known in the art, such as an outer protective jacket and a plurality of longitudinally extending conductive neutral wires. The insulation layer 40 has a generally tubular configuration that extends the length of the cables or cable sections 30 and 32. The insulation layer 40 is suitably formed from a high molecular weight polyethylene (HMWPE) polymer, a cross-linked polyethylene (XLPE), an ethylene-propylene rubber (EPR) or other solid dielectrics, wherein each may include water tree retardants, fillers, anti-oxidants, UV stabilizers, etc.

The conductive core 36 is coaxially received within the insulation layer 40 and is centrally located therein. The conductive core 36 includes a plurality of electrically conductive stands, although a single strand may also be used. The strands of the conductive core 36 are constructed of a suitable conductive material, such as copper, aluminum, etc. In one embodiment, the conductive core 36 may be surrounded by a semiconductive or insulating strand shield (not shown). The strand shield may be suitably formed from a compound that includes polyethylene or a similar material and surrounds the conductive core 36 such that it is disposed between the conductive core 36 and the insulation layer 40.

In one embodiment, the cables or cable sections 30 and 32 are multiple conductive strand power cables, such as medium voltage cables that carry between 5,000 and 35,000 volts. Even though power cables are illustrated in embodiments herein, it should be apparent that other cables or cables sections, such as low voltage power cables, transmission voltage power cables, control cables, and communication cables including conductive pair, telephone, and digital communication cables, are also within the scope of the present invention. Thus, it should be apparent that within the meaning of the present invention, a cable or cable section not only includes electrical cables, but also light transmitting cables.

Figure 2:
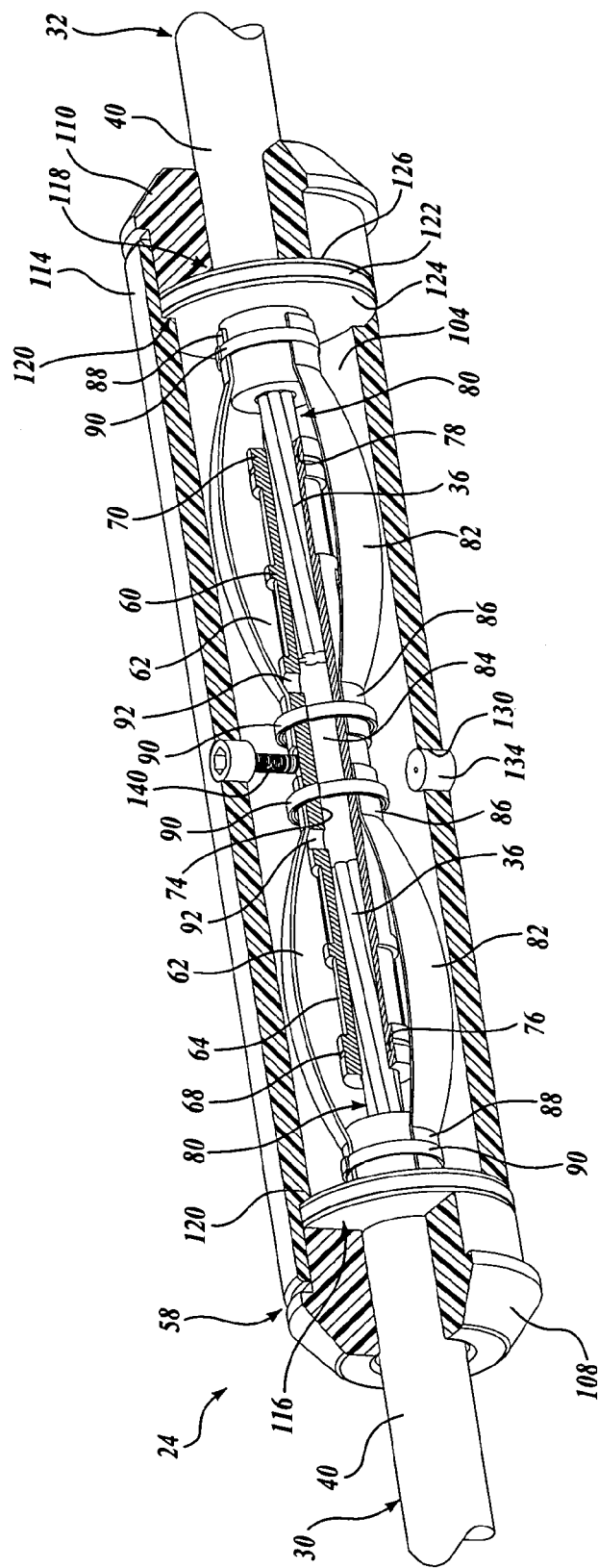
FIG. 2 is a perspective, partial cross sectional view of one suitable embodiment of an inner connector assembly suitable for use with the outer connector housing shown in FIG. 1.
Figure 3:
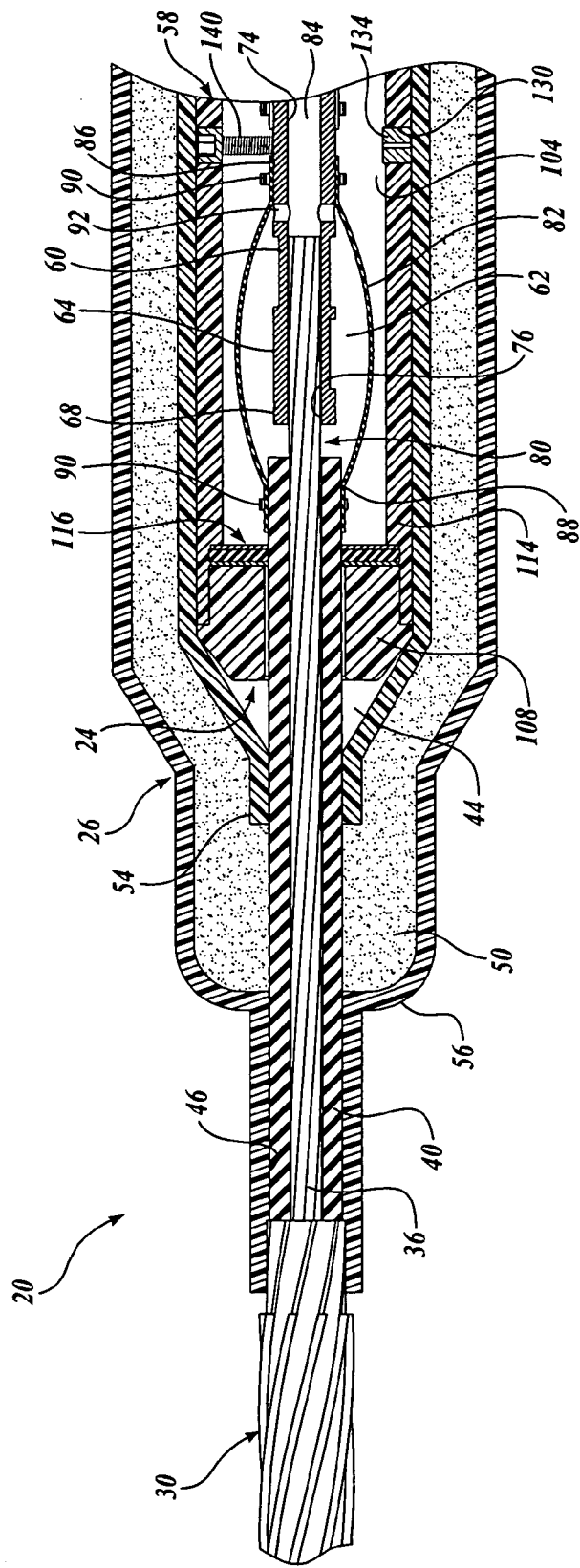
FIG. 3 is a cross sectional view of the left side of the cable connector shown in FIG. 1, the right side having a substantially identical configuration.

Referring to FIGS. 1-3, the components of the cable connector 20 will now be described in detail. As described above, one embodiment of the cable connector 20 includes an inner connector assembly 24 and an outer connector housing 26. As best shown in FIGS. 1 and 3, the outer connector housing 26 defines an interior cavity 44 for encasing the inner connector assembly 24. At its ends, the outer connector housing 26 includes first and second openings 46 and 48 for providing access to the interior cavity 44. The openings 46 and 48 are sized and configured for introducing the first and second cable sections 30 and 32, respectively, into interior cavity 44. In one embodiment, the outer connector housing 26 comprises an insulating layer 50 that is sandwiched between inner and outer semi-conductive shells 54 and 56.

Referring now to FIGS. 2 and 3, the inner connector assembly 24 comprises an inner connector housing 58 that houses a cable coupling 60 and one or more fluid reservoirs 62 that store remediation fluid. In the embodiment shown, the cable coupling 60 is a tubular structure constructed of an electrically conductive material, such as aluminum, copper, or suitable alloy. The cable coupling 60 defines an exterior surface 64, ends 68 and 70, and a through bore 74 that terminates as openings 76 and 78 at ends 68 and 70 of the cable coupling 60, respectively. The openings 76 and 78 of the through bore 74 are sized and configured for receiving conductive cores 36 of the electrical cables or cable section 30 and 32, respectively.

When assembled, portions of cables or cable sections 30 and 32 that have been stripped to remove the outer insulation layer 40 and other optional layers from the cables or cable sections are inserted into openings 76 and 78, respectively, and securely affixed thereto by techniques such as crimping, soldering, or adhesive bonding, to name a few. When affixed thereto, the cores 36 are electrically connected to the cable coupling 60 by direct contact, through the affixing mechanism, such as solder, etc, or other known techniques. As a result, the core 36 of the first cable or cable section 30 is electrically connected to the core 36 of the second cable or cable section 32 via the cable coupling 60.

The lengths of the exposed cores 36 are sufficient to extend into the through bore 74 at openings 76 and 78, as well as to extend outside of the cable coupling 60, when assembled. By extending outside of the cable coupling 60, a gap 80 is formed at both ends 68 and 70 of the cable coupling 60 between the insulation layer 40 of each cable or cable section 30 and 32 and the end faces of the cable coupling 60. The cores 36 of the cables or cable sections 30 and 32 preferably do not touch when assembled, thereby leaving an interior space between the ends of the cables or cable sections 30 and 32. Therefore, in accordance with one aspect of the present invention, the cable coupling 60 provides a first pathway 84 for remediation fluid that is introduced into the cables or cable sections 30 and 32 to intercommunicate therebetween. Accordingly, fluid supplied to either cable or cable section 30 or 32 from the opposite ends thereof may flow to the other cable or cable section 30 or 32 through the fluid pathway 84.

In one embodiment, the ends of the cables or cable sections 30 and 32 when inserted into the openings 76 and 78 are then secured in an electrically conductive manner to the cable coupling 60 by crimping each end 68 and 70 of the cable coupling 60, as known in the art. Crimping guides (not shown) may be provided on the exterior surface 64 of the cable coupling 60 to demark the appropriate location of crimping. Strain relief grooves (not shown) may be located on the exterior surface 64 of the cable coupling 60 adjacent the crimping guides, respectively, and provide relief from strain forces generated as the cable coupling 60 is crimped. Although a cable coupling 60 that is crimped around the cores for providing a mechanical and electrical connection therebetween is suitable for embodiments of the present invention, such embodiments of the invention are not intended to be so limited. For example, the cable coupling 60 can be substituted with any mechanical device configured to sufficiently affix the two cable cores in electrical communication while allowing fluidic intercommunication therebetween.

The inner connector assembly 24 further includes one or more internal fluid reservoirs 62 that are capable of storing remediation fluid, such as CABLECURE®, CABLECURE®/XL, CABLECURE®/SD, CABLECURE®/CB, Acetephenone, etc. In the embodiment shown, the internal fluid reservoirs 62 are defined by one or more bladders 82. Each bladder 82 is preferably constructed from a pliable but impermeable material, such as an elastomer, e.g., rubber. As such, each fluid reservoir 62 may have a selectively adjustable inner volume. The bladders 82 are disposed in surrounding relation with the gaps 80. In the embodiment shown, the bladders 82 include openings disposed at their end sections 86 and 88. The end section openings of the bladders 82 receive therein respective portions of the cable coupling 60 and the cables or cable sections 30 and 32. The bladders 82 are suitably coupled in a sealed manner at their end sections 86 and 88 to the cable coupling 60 and the insulation layers 40 of the cables or cable sections 30 and 32, respectively. In one embodiment, the end sections 86 and 88 of the bladders 82 are removably affixed to the cable coupling 60 and the cables or cable sections 30 and 32 in a sealed manner by conventional band clamps 90; however, other removable and non-removable affixation techniques may be used, if desired. When assembled, the fluid reservoirs 62 defined by the bladders 82 are connected in fluid communication with the gaps 80. Accordingly, fluid injected into the cables or cable sections 30 and 32 may further be introduced into the bladders 82.

In accordance with another aspect of the present invention, the cable coupling 60 further includes one or more openings 92 disposed in its side wall, as best shown in FIG. 2. The openings 92 are configured to provide fluid communication with a portion of the through bore 74 from a location external the cable coupling 60. In one embodiment, the openings 92 are disposed inwardly from the ends of the affixed cores 36 so that the openings 92 are connected in fluid communication with the fluid pathway 84. When the bladders 82 are affixed to the cable coupling 60, the fluid reservoirs 62 are connected in fluid communication with the openings 92. As such, the fluid reservoirs 62 are connected in fluid communication with the fluid pathway 84 via the openings 92.

While the fluid reservoirs 62 are defined in this embodiment by flexible bladders 82, it will be appreciated that rigid or semi-rigid bladders may also be used. Additionally, it will be appreciated that other expandable and non-expandable structures that define fluid reservoirs may be practiced with embodiments of the present invention. Further, while two bladders were shown and described, it will be appreciated that in some embodiments, one or both of the bladders may be omitted.

The inner connector assembly 24 further includes an inner connector housing 58 that defines an interior cavity 104 for encasing the internal components of the assembly, including the cable coupling 60 and the fluid reservoirs 62. In one embodiment, the interior cavity 104 is oversized so as to create space between the internal components of the assembly and the inner connector housing 58, the benefit of which will be described in detail below. In the embodiment shown, the inner connector housing 58 is assembled from first and second end sections 108, 110 and a main body section 114. While a cylindrical housing is shown, other shapes may be practiced with and are considered to be within the scope of the present invention. The end sections 108, 110 may be removably or non-removably connected to the main body section 114. In one embodiment, the end sections 108, 110 may be removably connected to the main body section 114 through cooperating threaded engagement (not shown); however other known techniques may be used. The end sections 108 and 110 define aligned openings for introducing the cables or cable sections 30 and 32 into the interior cavity 104.

In the embodiment shown, the interior cavity 104 is sealed at its ends by compression seals 116 and 118. Alternatively, the cavity 104 may be sealed by o-rings, compression rings, gaskets, sealing threads or any other suitable seals or sealing means capable of isolating the interior cavity 104 of the inner connector housing 58 from the environment. The compression seals 116 and 118 rest against inner peripheral shoulder regions 120 defined by the main body section 114 at each end. In one embodiment, the compression seals 116 and 118 are formed by an elastomeric disc 122 sandwiched between two discs 124 and 126 constructed of a material harder than that of the elastomeric disc 122.

When assembled, the seals 116 and 118 are concentrically disposed over the insulation layer 40 of the cables or cable sections 30 and 32. The end sections 108, 110 press the seals 116 and 118 against the shoulder regions 120 of the main body section 114, thereby compressing the elastomeric discs 122. By compressing the elastomeric discs 122, the elastomeric discs 122 expand outwardly and contact the inner surface of the main body section 114 and the outer surface of the insulation layer 40 in sealing engagement.

In one embodiment, the remaining space that surrounds the bladders 82 within the interior cavity 104 of the inner connector housing 58 may be used to contain pressurized fluid for applying pressure against the bladders 82. As such, the remaining space may be referred to as an actuator chamber. An actuator chamber access port 130 may be disposed in the inner connector housing 58 for introducing a pressurized fluid, such as gas, into the actuator chamber. In several embodiments, pressures within the actuator chamber are contemplated to be approximately 3-10 psi.

Although chamber pressures within the range of 3-10 psi are described in one embodiment, it should be apparent that the embodiments of the present invention are not intended to be so limited. As a non-limiting example, high chamber pressures are also within the scope of the present invention. Therefore, pressure ranges cited herein are intended to be non-limiting examples, and as such, a wide range of chamber pressures are within the scope of the present invention. It will be appreciated that the actuator chamber access port 130 may be fitted with a suitable valving mechanism 134, such as a poppet valve, for providing selective access to the actuator chamber.

It will be appreciated that the shape of the bladders 82 are determined by the amount of fluid it contains and the pressure that is applied thereto. While the preferred embodiment utilizes compressed gas as the force generator, polymeric bushings, compression springs or the like could be used to pressurize the remediation fluid contained in the bladders 82 by applying force against the bladders 82 or through an intermediary device, such as a piston, to more evenly distribute the force. Such a force generator would not require the actuator chamber access port.

Still referring to FIG. 2, the inner connector housing 58 is electrically connected to the cable coupling 60 for maintaining the inner connector housing 58 at the same voltage potential as the cable coupling 60. In the embodiment shown, an electrically conductive member 140, such as a metallic bolt or spring, contacts the cable coupling 60 and a portion of the inner connector housing 58.

In operation, remediation fluid is pumped or otherwise injected into the cables or cable sections 30 and 32 from the opposite end of the cable connector 20. As the remediation fluid passes through the cables or cables sections 30 and 32, it exits the cables or cable sections 30 and 32 by passing through the interstitial spaces between the strands of the exposed cores 36 and fills the fluid reservoirs 62 defined by the bladders 82. The pumping process continues until additional remediation fluid is pumped into the cable connector 20 to fill the fluid reservoirs 62 of the bladder 82. Doing so provides the bladders 82 with additional remediation fluid which, over a period of time, is introduced or forced into the cables or cable sections 30 and 32, replacing that which is lost by diffusion into the cable insulation. After the electrical connector 20 and cable 40 have been filled with remediation fluid, the remediation fluid begins to diffuse into the cable insulation. As fluid is depleted in the cables or cable sections 30 and 32, it is replenished by the fluid remaining in the fluid reservoirs 62.

In embodiments where the actuator chamber is pressurized, compressed gas may be selectively injected into the actuator chamber through the access port 130 prior to fluid injection. During use, the pressurized fluid contained within the actuator chamber applies pressure against the bladders 82, which in turn, applies pressure to the fluid occupying the fluid reservoirs 62. It will be appreciated that the pressure exerted against the bladders 82 aids in driving the fluid from the bladders 82 into the cable or cable sections 30 and 32.

Figure 4:
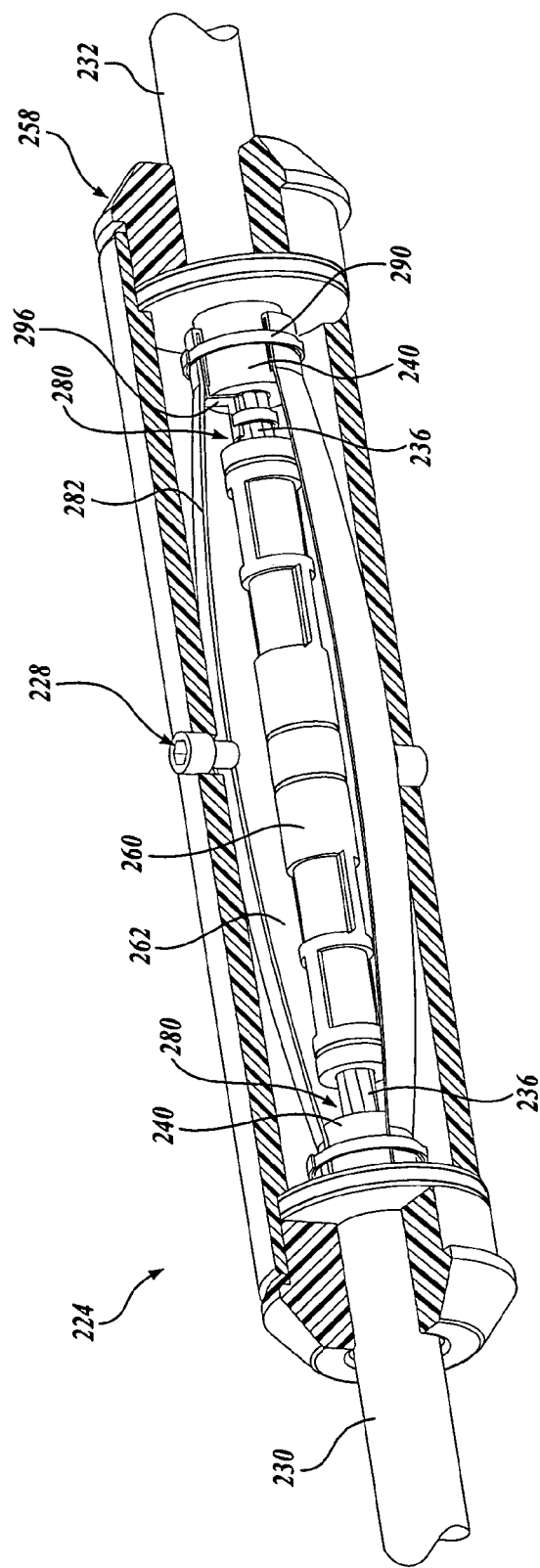
FIG. 4 is a perspective, partial cross sectional view of another exemplary embodiment of an inner connector assembly suitable for use with the outer connector housing shown in FIG. 1.

FIG. 4 illustrates another exemplary embodiment of an inner connector assembly 224 constructed in accordance with aspects of the present invention for use with the outer connector housing 26 of FIG. 1. The inner connector assembly 224 is substantially similar in materials, construction, and operation as the inner connector assembly 24 of FIG. 1, except for the differences that will now be described. In this embodiment, a single bladder 282 that defines a fluid reservoir 262 is utilized. The bladder 282 extends from the insulation layer 240 of the first cable or cable section 230 to the insulation layer 240 of the second cable or cable section 232, thereby covering the gaps 280 formed by the exposed cores 236 of the first and second cable or cable sections 230 and 232.

The bladder 282 is preferably constructed of a semi-conductive elastomeric material. When assembled, the bladder 282 is electrically connected to the inner assembly housing 258. In the embodiment shown, an electrically conductive member 228 electrically connects the bladder 282 to a portion of the inner assembly housing 258. In the embodiment shown, a conductive adapter 296 is provided that electrically links the exposed core 236 to the bladder 282. The adapter 296 contacts and is retained against the exposed core 236 of the second cable or cable section 232 by a band clamp. The adapter 296 further contacts and is retained against the inner surface of one end section of the bladder 282 by a band clamp 290.

Figure 5:
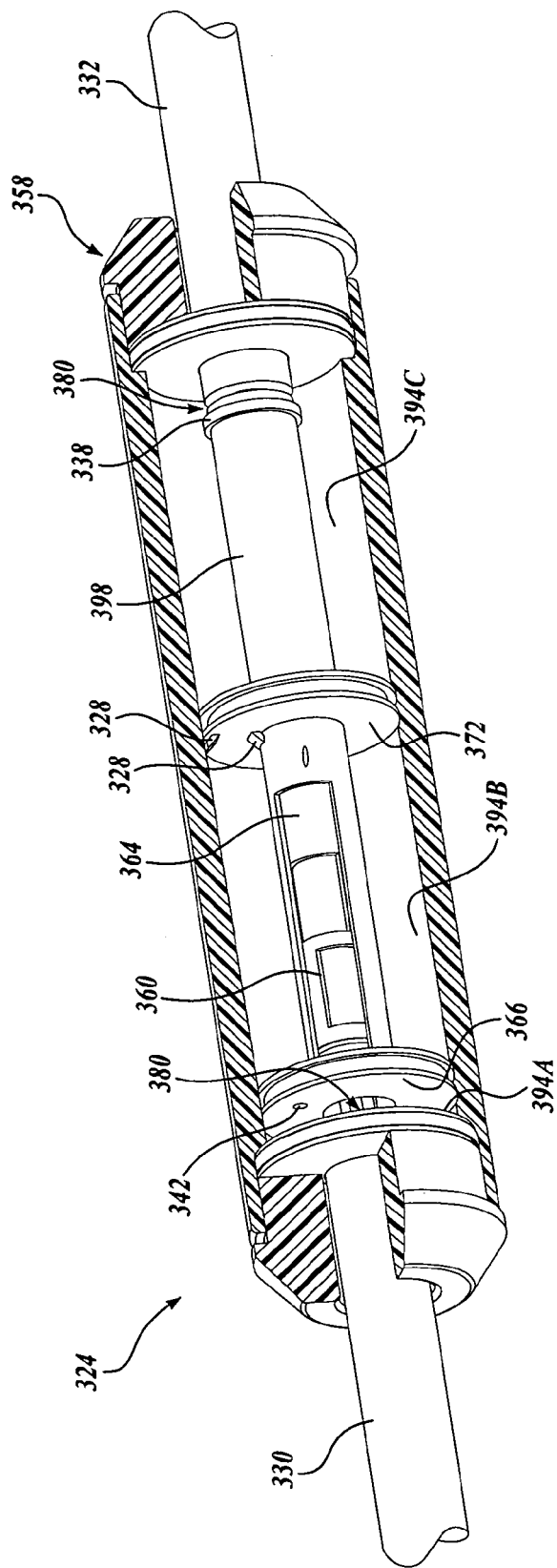
FIG. 5 is a perspective, partial cross sectional view of another exemplary embodiment of an inner connector assembly suitable for use with the outer connector housing shown in FIG. 1.

FIG. 5 illustrates another exemplary embodiment of an inner connector assembly 324 constructed in accordance with aspects of the present invention for use with the outer connector housing 26 of FIG. 1. The inner connector assembly 324 is substantially similar in materials, construction, and operation as the inner connector assembly 24 of FIG. 1, except for the differences that will now be described. In this embodiment, the bladders are omitted and in their stead are one stationary piston 366 and one movable piston 372 that define three fluid tight chambers 394A-394C. The first and third chambers 394A and 394C are disposed in fluid communication with the gaps 380 formed by the exposed cores of the cables or cable sections 330 and 332. The first and third chambers 394A and 394C are filled with remediation fluid during use, and therefore, can be referred to as fluid reservoirs. The second chamber 394B, located in between the first and third chambers 394A and 394C, may be filled with compressed gas, and therefore, can be referred to as an actuation chamber. When assembled, the pistons 366 and 372 are disposed on a hollow sleeve 398, which is concentrically disposed over the coupling 360.

The hollow sleeve 398 defines a constant outer diameter. The stationary piston 366 is fixedly coupled at one end of the sleeve 398 by techniques known in the art, such as welding, mechanical fasteners, etc. while the movable piston 372 is slidably coupled in a sealing manner to the sleeve 398. At the end of the sleeve 398 opposite the stationary piston 366, a stopper ring 338 is fixedly attached thereto for providing an end stop for the movable piston 372. In use, the movable piston 372 is capable of sliding between the stationary piston 366 and the stopper ring 338. The pistons 366 and 372 are both configured to sealingly engage the sleeve 398 at their inner circumferential surface as well as sealingly engage the inner surface of the inner assembly housing 358. Accordingly, each chamber 394A-394C is fluidly isolated from one another.

In one embodiment, the inner bore of the sleeve 398 is sized and configured to provide space between the inner surface of the sleeve bore and the outer surface 364 of the coupling 360. In this embodiment, the space created between the coupling and the sleeve forms a second fluid pathway. Alternatively, the inner bore of the sleeve 398 may be sized and configured to slidably contact the outer surface 364 of the coupling 360.

While a sleeve 398 has been proved in the illustrative embodiment, it will be appreciated that the sleeve 398 may be replaced by configuring the exterior surface 364 of the cable coupling 360 with a constant diameter.

The stationary piston 366 may further include an access port 342. The access port 342 provides access to the second, actuator chamber 394B for supplying pressurized gas thereto. The movable piston 372 further includes contact protrusions 328 positioned at the inner and outer peripheries of the piston 372 such that the protrusions 328 remain in contact with the sleeve 398 and the inner connector housing 358 during use. The piston 372 is preferably constructed of a conductive or semiconductive material so that the inner connector housing 358 is electrically connected to the sleeve 398. In embodiments where a space is formed between the sleeve 398 and the cable coupling 360, a conductive link may be provided for electrically connecting the coupling 360 with the sleeve 398.

Figure 6:
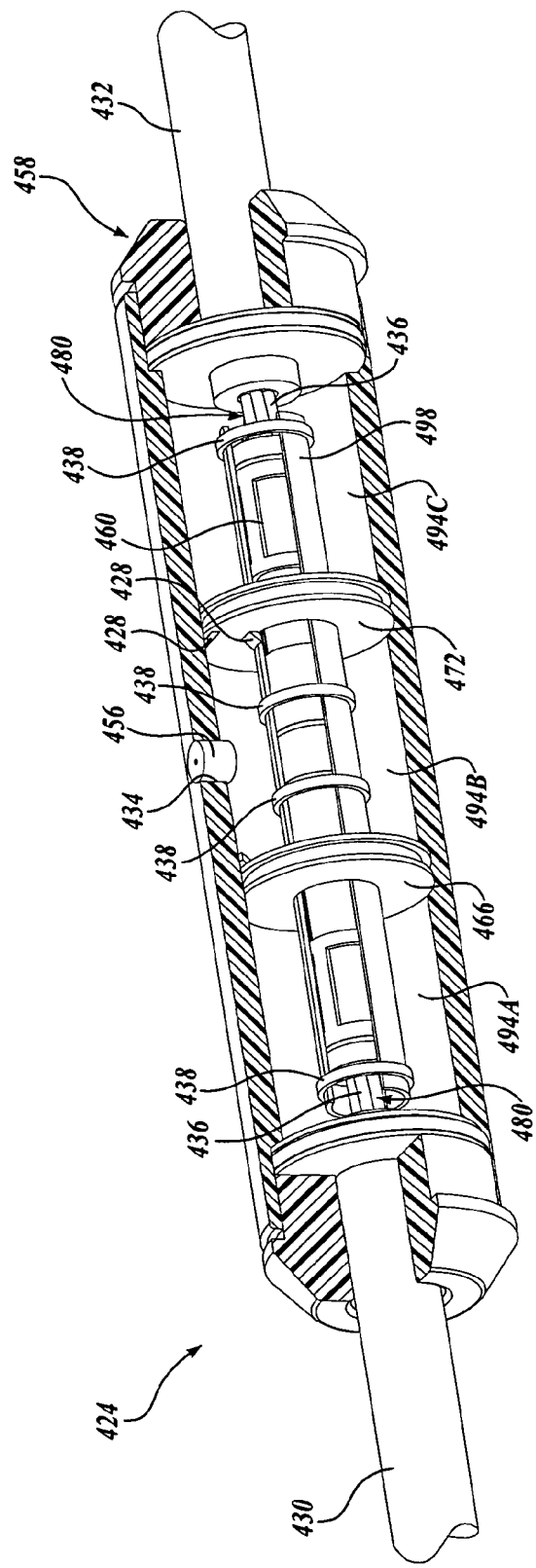
FIG. 6 is a perspective, partial cross sectional view of another exemplary embodiment of an inner connector assembly suitable for use with the outer connector housing shown in FIG. 1 and showing parts thereof, such as a collar, cut-away for clarity.

FIG. 6 illustrates another exemplary embodiment of an inner connector assembly 424 constructed in accordance with aspects of the present invention for use with the outer connector housing 26 of FIG. 1. The inner connector assembly 424 is substantially similar in materials, construction, and operation as the inner connector assembly 324 of FIG. 5, except for the differences that will now be described. In this embodiment, the stationary piston is permitted to move, and is hereinafter referred to as movable piston 466. The movable pistons 466 and 472 define three fluid tight chambers 494A-494C. The first and third chambers 494A and 494C are disposed in fluid communication with the gaps 480 formed by the exposed cores 436 of the cables or cable sections 430 and 432. The first and third chambers 494A and 494C are filled with remediation fluid during use, and therefore, can be referred to as fluid reservoirs. The second chamber 494B, located in between the first and third chambers 494A and 494C, may be filled with compressed gas, and therefore, can be referred to as an actuator chamber.

Pairs of stopper rings 438 are fitted at the ends of the sleeve 498 and in the center region of the sleeve 498 for providing end stops for the movable pistons 466 and 472. In use, the pistons 466 and 472 are capable of sliding between the inner and outer stopper rings 438. The pistons 466 and 472 are configured to sealingly engage the sleeve 498 at its inner circumferential surface and sealingly engages the inner surface of the inner assembly housing 458. Accordingly, each chamber is fluidly isolated from one another. The inner connector housing 458 further includes an actuator chamber access port 434 for providing access to the actuator chamber. It will be appreciated that the actuator chamber access port 434 may be fitted with a suitable valving mechanism 456, such as a poppet valve, for providing selective access to the actuator chamber. In use, pressurized fluid introduced and stored within the actuator chamber exerts pressure on the fluid chambers 494A and 494C via the movable pistons 466 and 472, thereby driving the remediation fluid contained therein into the cables or cable sections 430 and 432.

While the preferred embodiments utilize compressed gas as the force generator, polymeric bushings, compression springs or the like could be used to pressurize the remediation fluid contained in the fluid chambers 494A and 494C by applying force thereagainst. Such a force generator would not require the actuator chamber access port.

Figure 7:
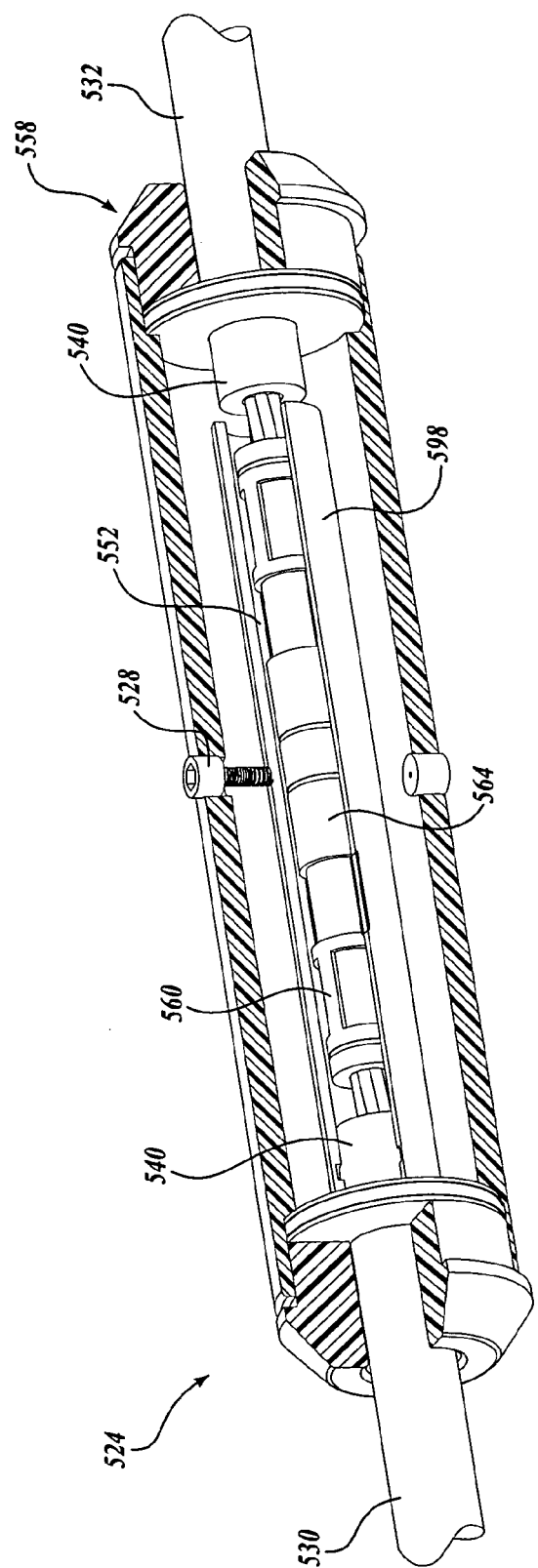
FIG. 7 is a perspective, partial cross sectional view of another exemplary embodiment of an inner connector assembly suitable for use with the outer connector housing shown in FIG. 1.

FIG. 7 illustrates another exemplary embodiment of an inner connector assembly 524 constructed in accordance with aspects of the present invention for use with the outer connector housing 26 of FIG. 1. The inner connector assembly 524 of the present embodiment is intended to be used in a substantially vertical orientation. However, it should be apparent to one of ordinary skill that the inner connector assembly 524 is not intended to be so limited. As non-limiting examples, the inner connector assembly 524 may be positioned in a substantially horizontal, oblique, or obtuse angular orientation. Such embodiments are also within the scope of the present invention.

The inner connector assembly 524 is substantially similar in materials, construction, and operation as the inner connector assembly 24 of FIG. 1, except for the differences that will now be described. As best shown in FIG. 7, the bladders of FIG. 1 are replaced by an elongated hollow sleeve 598 disposed in concentric relation with the cable coupling 560. One end of the sleeve 598 covers the insulation layer 540 of either the first or second cable or cable section 530 or 532. The sleeve 598 extends from the insulation layer 540 of one cable or cable section 530 or 532 toward the opposite end of the coupling 560.

The end of the sleeve 598 is sealingly engaged with the insulation layer 540. In one embodiment, the inner surface of the sleeve bore may include one or more peripheral grooves for receiving seals, such as o-rings, to create a sealing interface between the insulation layer 540 and the inner surface of the sleeve 598. Alternatively, the sealing connection may be achieved by heat bonding, adhesives, heat shrinking seals, or clamp rings, just to name a few.

The inner bore of the sleeve 598 is sized so as to define a fluid passageway 552 in-between the inner bore surface of the sleeve 598 and the outer surface 564 of the coupling 560. The outer surface of the sleeve 598 is sized so that space is provided for defining a fluid reservoir between the outer surface of the sleeve 598 and the inner connector housing 558. The sleeve 598 is electrically connected to the inner connector housing 558 by conductive link 528. The sleeve 598 may be electrically connected to the coupling 560 or the cores of the first or second cable or cable section 530 or 532. Thus, the inner connector housing 558 may remain at the same voltage potential as the coupling 560.

Figure 8:
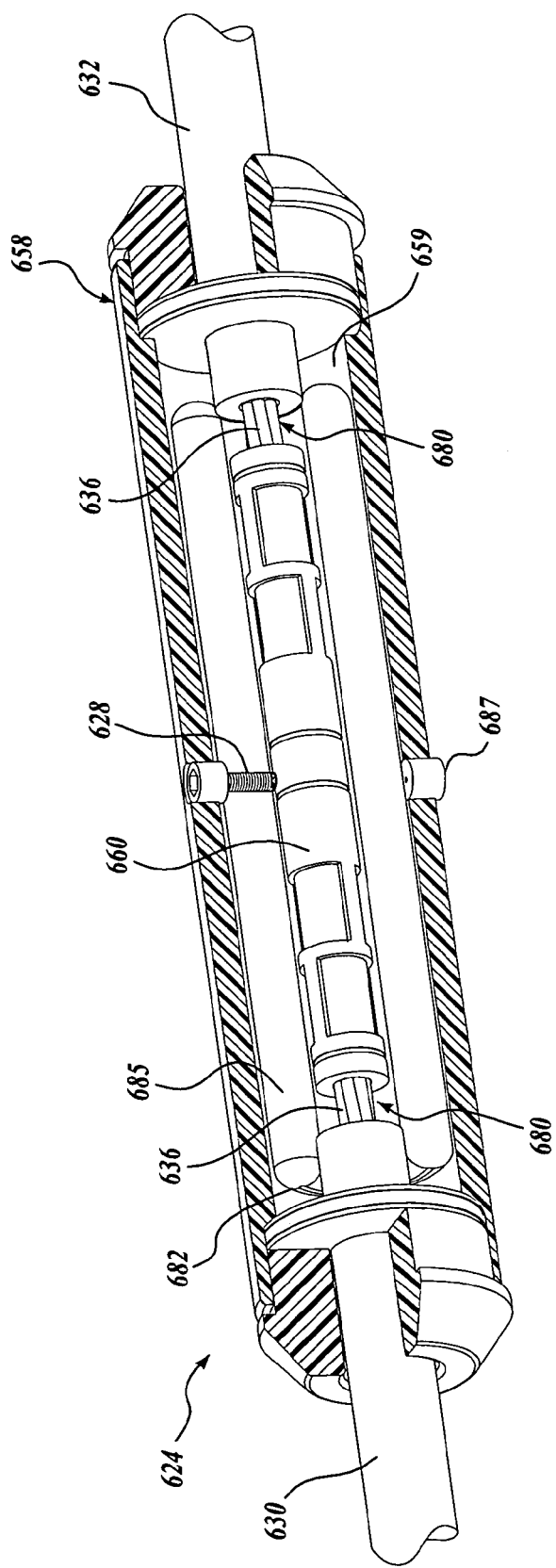
FIG. 8 is a perspective, partial cross sectional view of yet another exemplary embodiment of an inner connector assembly suitable for use with the outer connector housing shown in FIG. 1.

FIG. 8 illustrates another exemplary embodiment of an inner connector assembly 624 constructed in accordance with aspects of the present invention, which is suitable for use with the outer connector housing 26 of FIG. 1. The inner connector assembly 624 is substantially similar in materials, construction, and operation as the inner connector assembly 24 of FIG. 1, except for the differences that will now be described. In this embodiment, the inner connector housing 658 defines an interior cavity 659 for encasing the internal components of the assembly, including the cable coupling 660 and an elastic bladder 682. In one embodiment, the interior cavity 659 is oversized so as to create space between the internal components of the assembly and the inner connector housing 658. In use, as will be described in detail below, this space is filled with remediation fluid, and thus, may be referred to as a fluid reservoir.

When assembled, the bladder 682 is disposed within the interior cavity 659 of the inner connector housing 658 and extends along a portion of the cable coupling 660. In one embodiment, the bladder is disposed in surrounding relation with the cable coupling 660 and extends from the insulation layer of cable 630 to the insulation layer of cable 632. In this embodiment, the bladder 682 is preferably not sealed at its ends to the insulation layer 640 of the cable or cable sections 630 and 632, and thus, allows fluid when present to flow between the gaps 680 and the fluid reservoir defined by the interior cavity. The bladder 682 defines an interior chamber that in one embodiment my contain a gas under pressure, as will be described in detail below. In one embodiment, the bladder 682 has a U-shaped cross section for providing appropriate fluid flow between the gaps 680 and the fluid reservoir, while further providing space for an electrically conductive member 628, such as a metallic bolt or spring, to electrically link the cable coupling 660 with the inner connector housing 658. Alternatively, to electrically link the inner connector housing 658 and the cable coupling 660 for maintaining the inner connector housing 658 at the same voltage potential as the cable coupling 660, the bladder 682 may be constructed of a conductive or semi-conductive material and may be configured and arranged to suitably interconnect the cable coupling 660 and the inner connector housing 658 in electrical communication. It will be appreciated that in such an embodiment, the bladder 682 can have cross-sectional shapes other than U-shaped.

In one embodiment, an interior chamber 685 defined by the bladder 682 may contain or be filled with gas under pressure, and may be referred to as an actuator chamber. To that end, the bladder 682 includes a valved inlet (not shown but well known in the art) for selectively accessing the interior chamber 685 of the bladder 682. In embodiments of the present invention, the bladder 682 may be filled with pressurized gas prior to assembly, or may be filled after assembly of the inner connector housing 658 through a valve 687, such as a poppet valve, located in the inner connector housing 658. A fluid passageway is provided that interconnects the valve and the interior chamber of the bladder 682 in fluid communication. In either case, it is preferable to fill the interior chamber 685 of the bladder 682 with pressurized gas prior to the introduction of remediation fluid into the cable or cable sections 630 and 632. In one embodiment, the gas contained in the interior chamber 685 is initially pressurized to approximately 5 psi, although other pressures may be practiced with the present invention, and thus, are within the scope of the present invention.

Prior to use, the inner connector housing 658 is assembled in a fluid tight manner and the bladder 682 can be optionally filled with pressurized gas. Fluid is then injected into the cables or cable sections 630 and 632 from the opposite end of the inner connector housing 658. As the remediation fluid passes through the cables or cables sections 630 and 632, it exits the cables or cable sections 630 and 632 by passing through the interstitial spaces between the strands of the exposed cores 636 at gaps 680 and fills the fluid reservoir.

In embodiments where the bladder 682 is filled with pressurized gas, the fluid injected into the cables or cable sections 630 and 632 is preferably injected into the cables or cable sections 630 and 632 at a higher pressure than the gas contained in the bladder interior chamber 685. As the fluid is injected into the cables or cable sections 630 and 632, the fluid continuously fills the fluid reservoir as it exits the cables or cable sections 630 and 632 at gaps 680. While fluid occupies the fluid reservoir, the fluid exerts pressure against the bladder 682, thereby compressing the bladder 682 into a smaller volume. By compressing the bladder 682 into a smaller volume, the volume or fluid capacity of the fluid reservoir increases. This decrease in the volume of the bladder interior chamber 685 increases the internal pressure of the pressurized gas contained therein. This process continues until an equilibrium between the fluid pressure in the fluid reservoir and the pressurized gas within the bladder 682 is reached.

During use, the remediation fluid stored in the fluid reservoir is introduced over a period of time into the cables or cable sections 630 and 632, replacing that which is lost by diffusion into the cable insulation. In embodiments where the bladder interior chamber 685 is filled with pressurized gas, the pressurized gas contained within the interior chamber 685 applies pressure against the fluid contained in the fluid reservoir and imparts a driving force against the fluid to force the fluid from the fluid reservoir into the cable or cable sections 630 and 632. It will be appreciated that the bladder could also be an or contain therein an elastomeric spring.

The principles, preferred embodiments, and modes of operation of the present invention have been described in the foregoing description. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes, and equivalents which fall within the spirit and scope of the present invention.

The embodiments of the invention in which an exclusive property or privilege is claimed are defined as follows:

1. An apparatus for interconnecting a first cable and a second cable, wherein said first and second cables each comprise an exposed electrically conductive core and an outer insulating layer, the apparatus comprising:
    a coupling that electrically interconnects the first and second cables by receiving at least a portion of the first and second cables within a through bore of the coupling, wherein the coupling defines a first fluid pathway within the coupling that connects the core of the first cable in fluid communication with the core of the second cable; and
    at least one internal fluid reservoir disposed in fluid communication with the core of the first or second cable.

2. The apparatus of claim 1, wherein the internal fluid reservoir is sealed from the environment.

3. The apparatus of claim 1, further comprising a bladder, wherein the bladder defines the internal fluid reservoir.

4. The apparatus of claim 3, wherein pressurized fluid occupies the bladder.

5. The apparatus of claim 3, wherein the bladder is rigid or expandable.

6. The apparatus of claim 3, wherein the bladder is constructed of a semi-conductive material.

7. The apparatus of claim 3, wherein the bladder is connected in electrical communication with the coupling or the first or second core.

8. The apparatus of claim 1, further comprising a housing that encases the coupling, wherein the housing defines the fluid reservoir.

9. The apparatus of claim 8, wherein the housing electrically contacts the coupling and/or the core.

10. The apparatus of claim 1, wherein the fluid reservoir is disposed in fluid communication with the first and second cables.

11. The apparatus of claim 1, further comprising means for forcing fluid into the first or second cable.

12. The apparatus of claim 1, further comprising an actuator chamber, wherein the actuator chamber is fluidly isolated from the fluid reservoir.

13. The apparatus of claim 12, wherein the actuator chamber contains fluid under pressure.

14. The apparatus of claim 13, wherein the pressurized fluid exerts pressure against fluid contained in the fluid reservoir.

15. The apparatus of claim 12, wherein the actuator chamber is defined by a bladder.

16. The apparatus of claim 12, further comprising a housing that encases the coupling, wherein the housing defines the actuator chamber.

17. The apparatus of claim 12, further comprising a piston separating the fluid reservoir and the actuator chamber, wherein the piston is movable in the direction of the fluid reservoir upon application of pressure from the actuator chamber.

18. The apparatus of claim 17, wherein the pressure is supplied by a biasing device or pressurized fluid.

19. The apparatus of claim 1, wherein the fluid reservoir is exposed to externally applied pressure for driving fluid from the fluid reservoir into the first or second cable.

20. The apparatus of claim 19, wherein the pressure is supplied by a biasing device or pressurized fluid.

21. The apparatus of claim 1, wherein the fluid reservoir is exposed to internally applied pressure for driving fluid from the fluid reservoir into the first or second cable.

22. The apparatus of claim 1, further comprising means for applying pressure against fluid disposed in the internal fluid reservoir.

23. The apparatus of claim 1, wherein the fluid reservoir has an adjustable volume.

24. The apparatus of claim 1, further comprising a second interior fluid reservoir disposed in fluid communication with the core of the other of the first or second cable.

25. The apparatus of claim 1, further comprising a sleeve having an inner bore, the coupling being concentrically disposed within the inner bore, wherein the coupling extends along at least a portion of the sleeve.

26. The apparatus of claim 25, wherein the sleeve is configured such that a second fluid pathway is formed between the inner surface of the inner bore and the exterior surface of the coupling, the second fluid pathway extending from one end of the sleeve to the other.

27. An apparatus for interconnecting a first cable and a second cable, wherein said first and second cables each comprise an exposed electrically conductive core and an outer insulating layer, the apparatus comprising:

a coupling having a through bore sized and configured to receive at least a portion of the first and second cables, the coupling electrically interconnecting the first and second cables when the at least a portion of the first and second cables are received within the coupling, wherein the coupling defines a first fluid pathway within the coupling that connects the core of the first cable in fluid communication with the core of the second cable;

at least one internal fluid reservoir disposed in fluid communication with either core of the first and/or second cable; and an actuator chamber fluidly isolated from the at least one internal fluid reservoir.

28. The apparatus of claim 27, wherein the contents of the actuator chamber generates a force that is imparted against fluid disposed in the at least one internal fluid reservoir.

29. The apparatus of claim 28, further comprising first and second internal fluid reservoirs disposed in fluid communication with the cores of the first and second cables, respectively, and first and second pistons that exert at least one force generated by the actuator chamber against fluid disposed in the first and/or second internal fluid reservoirs.

30. An apparatus for interconnecting a first cable and a second cable, wherein said first and second cables each comprise an exposed electrically conductive core and an outer insulating layer, the apparatus comprising:

a housing that defines a sealable interior cavity;

a coupling disposed in the interior cavity, the coupling having a through bore for electrically and mechanically interconnecting the first and second cables, wherein the coupling defines a first fluid pathway that connects the core of the first cable in fluid communication with the core of the second cable;

a fluid reservoir disposed in the interior cavity; and means for forcing the contents of the fluid reservoir into the core of the first and/or second cable.

* * * * *